P. H. JACKSON.
STEERING APPARATUS.
No. 77,288. Patented Apr. 28, 1868
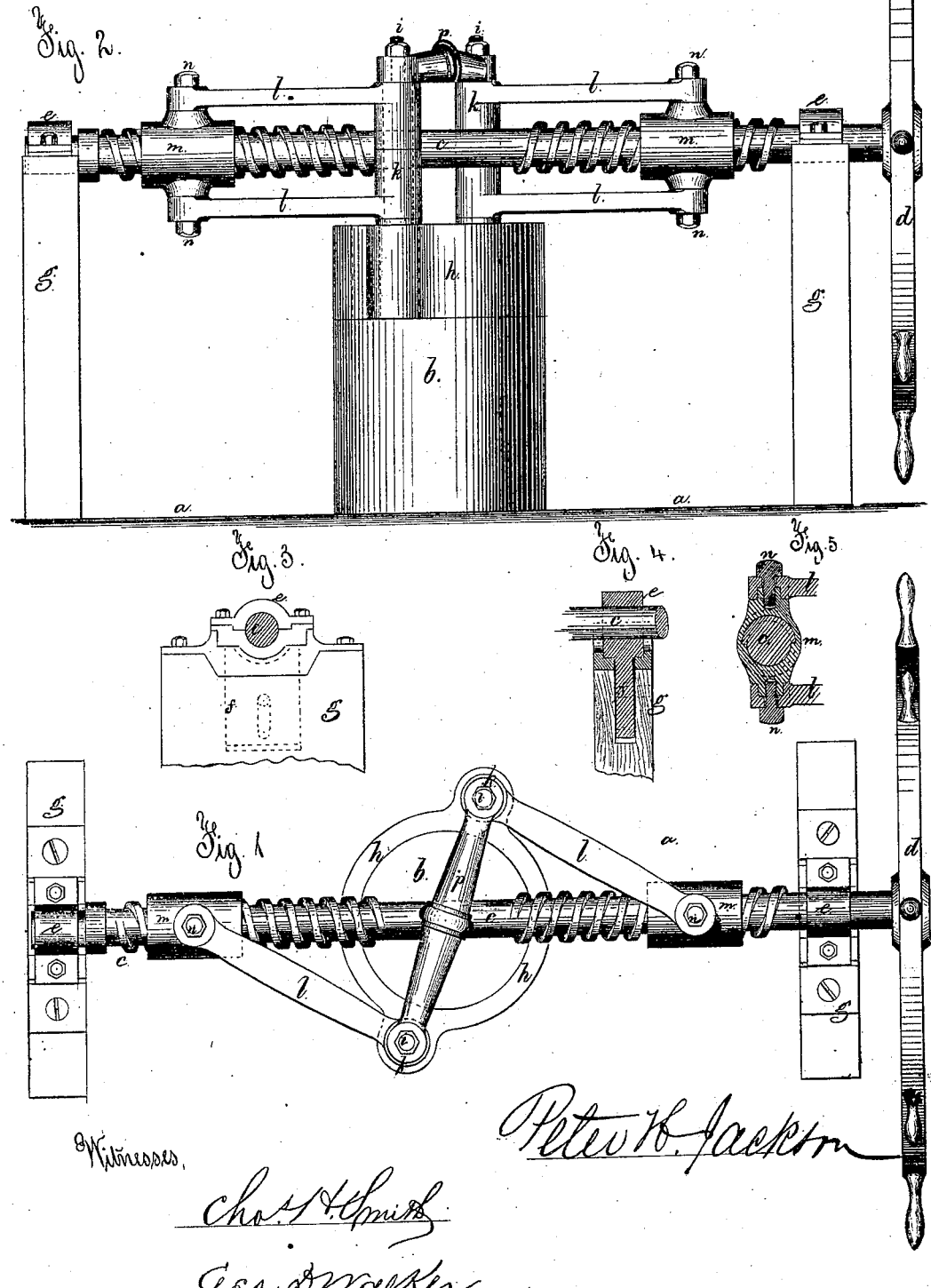

United States Patent Office.

PETER H. JACKSON, OF NEW YORK, N. Y.

Letters Patent No. 77,288, dated April 28, 1868.

IMPROVEMENT IN STEERING-APPARATUS.

*The Schedule referred to in these Letters Patent and making part of the same.*

TO ALL WHOM IT MAY CONCERN:

Be it known that I, PETER H. JACKSON, of the city and State of New York, have invented and made a certain new and useful Improvement in Steering-Apparatus for Vessels; and I do hereby declare the following to be a full, clear, and exact description of the said invention, reference being had to the annexed drawing, making part of this specification, wherein—

Figure 1 is a plan of said apparatus.
Figure 2 is a side elevation of the same.
Figure 3 is an elevation of the boxes for the screw, endwise of the shaft; and
Figure 4 is a section of the box or bearing longitudinally of the shaft.

Similar marks of reference denote the same parts.

A steering-apparatus has heretofore been made, in which a shaft with a right-and-left screw-thread upon it has been placed across the upper end of the rudder-head, and rotated by the steering-wheel, the motion being communicated from nuts by links, jointed at the respective ends to the nuts, and to vertical studs on the rudder-head, and also double-jointed between these points, so as to allow the rudder-head to work as the ship moves. With this construction there are so many joints that difficulty is experienced in the parts becoming loose, bent, or twisted, under the strain to which it is frequently subjected.

The nature of my said invention consists in two nuts upon a right and left-handed screw, that is set in vertical sliding boxes, in combination with arms that extend in pairs from such nuts to vertical gudgeons on the rudder-head, said arms having at their respective ends joints connecting with the nuts, and sleeves setting over said gudgeons.

By this construction and arrangement, the steering-apparatus is made much stronger than heretofore, and less liable to injury in use, because there are but few joints, and those of the strongest character, and there is no opportunity for injury in consequence of leverage strain of one part on the other.

I also mount the screw-shaft in vertically-sliding boxes, so that the rudder-stock is allowed to rise or fall by the working of the ship, or by the stern running aground, thus relieving the screw from friction and strain, but keeping it in the proper position for acting upon the rudder.

In the drawing, $a$ represents a portion of the deck, $b$ the upper end of the rudder-stock. $c$ is the shaft, formed with right and left-hand screw-threads, and receiving at the end the steering-wheel $d$. $e\,e$ are the boxes for the shaft $c$, formed with sliding tenons $f$ on their under sides, entering corresponding mortises in the upper ends of the supporting-frames $g$, so that the shaft and its boxes can move vertically when the rudder-stock rises or falls.

From the band $h$ of the rudder-head, the vertical gudgeons $i$ project, and receive the sleeve portions $k$ of the arms $l$, that are united by the hinge-bolts or joints $n$ to the nuts $m$, upon the screw-shaft $c$, and $p$ is a bar connecting the upper ends of the gudgeons $i$.

It will now be understood that the sleeve portions $k$, being at right angles to the arms $l$, the screw-nuts and arms all receive their support from the rudder-head, and they are very strong. There are no loose joints, and the strain cannot bend or injure any of the parts when made proportionally strong, and a sea striking the rudder does not move the steering-wheel.

When the screw $c$ is rotated in one direction, the nuts $m$, being brought nearer together, turn the rudder one way, and the reverse movement turns the rudder the other way, and the arms $l$ acting as toggles on each side of the screw, the strain is balanced, and there is nothing tending to twist any of the parts.

The joints $n$ are made as shown in Figure 5, the nut $m$ having bosses or circular projections, that enter cavities in the arms $l$, so that strain upon the bolt is removed.

What I claim, and desire to secure by Letters Patent, is—

The right and left-handed screw-shaft $c$, set in vertical sliding boxes, in combination with the arms $l$, that are jointed in pairs to the nuts $m$, and extend to the gudgeons $i$ of the rudder-head, as and for the purposes specified.

In witness whereof, I have hereunto set my signature, this eighteenth day of October, A. D. 1867.

PETER H. JACKSON.

Witnesses:
CHAS. H. SMITH,
GEO. D. WALKER.